(12) United States Patent
De Laet et al.

(10) Patent No.: US 12,123,405 B2
(45) Date of Patent: Oct. 22, 2024

(54) INSULATED PITCH TUBE

(71) Applicants: ZF Friedrichshafen AG, Friedrichshafen (DE); ZF Wind Power Antwerpen N.V., Lommel (BE); Vestas Wind Systems A/S, Aarhus N (DK)

(72) Inventors: Wim De Laet, Antwerp (BE); Stijn Rottiers, Lokeren (BE)

(73) Assignees: ZF FRIEDRICHSHAFEN AG, Friedrichshafen (DE); ZF WIND POWER ANTWERPEN N.V., Lommel (BE); VESTAS WIND SYSTEMS A/S', Aarhus (DE)

( * ) Notice: Subject to any disclaimer, the term of this patent is extended or adjusted under 35 U.S.C. 154(b) by 50 days.

(21) Appl. No.: 17/641,109

(22) PCT Filed: Aug. 17, 2020

(86) PCT No.: PCT/EP2020/072959
§ 371 (c)(1),
(2) Date: Mar. 8, 2022

(87) PCT Pub. No.: WO2021/052694
PCT Pub. Date: Mar. 25, 2021

(65) Prior Publication Data
US 2022/0333580 A1    Oct. 20, 2022

(30) Foreign Application Priority Data
Sep. 20, 2019   (EP) ...................................... 19198723

(51) Int. Cl.
*F03D 80/80*   (2016.01)
*F03D 15/00*   (2016.01)

(52) U.S. Cl.
CPC ............ *F03D 80/85* (2016.05); *F03D 15/00* (2016.05); *F05B 2260/30* (2013.01); *F05B 2260/40311* (2013.01)

(58) Field of Classification Search
None
See application file for complete search history.

(56) References Cited

U.S. PATENT DOCUMENTS

| 1,035,902 A | 8/1912 | Prahar |
| 6,019,292 A | 2/2000 | Walther |

(Continued)

FOREIGN PATENT DOCUMENTS

| CN | 207161276 U | 3/2018 |
| CN | 108050021 A | 5/2018 |

(Continued)

OTHER PUBLICATIONS

EP-2508753-A1 Machine Translation (Year: 2012).*
U.S. Appl. No. 17/642,713, filed Mar. 14, 2022.

*Primary Examiner* — Juan G Flores
(74) *Attorney, Agent, or Firm* — LEYDIG, VOIT & MAYER, LTD.

(57) ABSTRACT

An arrangement including a transmission, a feedthrough tube, and a fixing means is disclosed. A fixing means is disclosed whereby the feedthrough tube is fixed in the transmission. The fixing means includes an electrical non-conductor. Arrangements are disclosed in which the feedthrough tube is fixed axially and immovably in the fixing means.

10 Claims, 1 Drawing Sheet

(56) References Cited

U.S. PATENT DOCUMENTS

| | | | | |
|---|---|---|---|---|
| 8,907,517 | B2* | 12/2014 | Mongeau | F03D 15/10 |
| | | | | 290/55 |
| 10,359,029 | B2* | 7/2019 | Smet | F03D 80/85 |
| 2013/0165288 | A1 | 6/2013 | Dinter et al. | |
| 2013/0270837 | A1* | 10/2013 | Mongeau | F03D 13/10 |
| | | | | 290/1 C |
| 2016/0341183 | A1* | 11/2016 | Smet | F03D 15/00 |
| 2017/0030335 | A1 | 2/2017 | Deicke et al. | |
| 2020/0224636 | A1* | 7/2020 | Meeks | F16C 33/201 |

FOREIGN PATENT DOCUMENTS

| | | |
|---|---|---|
| DE | 102014000044 B3 | 5/2015 |
| DE | 102014200674 A1 | 7/2015 |
| EP | 2080904 A1 | 7/2009 |
| EP | 2273112 A2 | 1/2011 |
| EP | 2508753 A1 | 10/2012 |
| EP | 2541058 A1 | 1/2013 |
| EP | 2617994 A1 | 7/2013 |
| EP | 2933483 A1 | 10/2015 |
| JP | S 5467162 A | 5/1979 |
| WO | WO 2013085130 A1 | 6/2013 |
| WO | WO 20180121819 A1 | 7/2018 |

* cited by examiner

INSULATED PITCH TUBE

CROSS REFERENCE TO RELATED APPLICATIONS

This application is a U.S. National Phase application under 35 U.S.C. § 371 of International Application No. PCT/EP2020/072959, filed on Aug. 17, 2020, and claims benefit to European Patent Application No. EP 19198723.9, filed on Sep. 20, 2019. The International Application was published in German on Mar. 25, 2021 as WO 2021/052694 A1 under PCT Article 21(2).

FIELD

The invention relates to transmissions.

BACKGROUND

In wind turbines, there is a trend toward integrated drive trains. In an integrated drive train, the transmission and the generator form a structural unit. This entails problems with stray currents. The stray currents can occur in the form of high-frequency alternating currents or low-frequency direct or alternating currents. There is a risk of damage occurring to toothings and rolling bearings due to voltage flashovers.

In order to avoid consequential damage due to stray currents, suitable measures for insulation must be taken. In the case of drive trains running at medium speed, however, the torques between the transmission and the generator that are to be transmitted are comparatively high. At the same time, there is a lack of available space between the transmission and the generator due to the integrated design of the drive train. This makes sufficient dimensioning of the torque-transmitting components difficult. This relates in particular to the electrical insulation of the torque-transmitting components.

SUMMARY

In an embodiment, the present disclosure provides an arrangement comprising a transmission, a feedthrough tube, and a fixing means, wherein the feedthrough tube is fixed in the transmission by means of the fixing means and wherein the fixing means comprises an electrical non-conductor.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
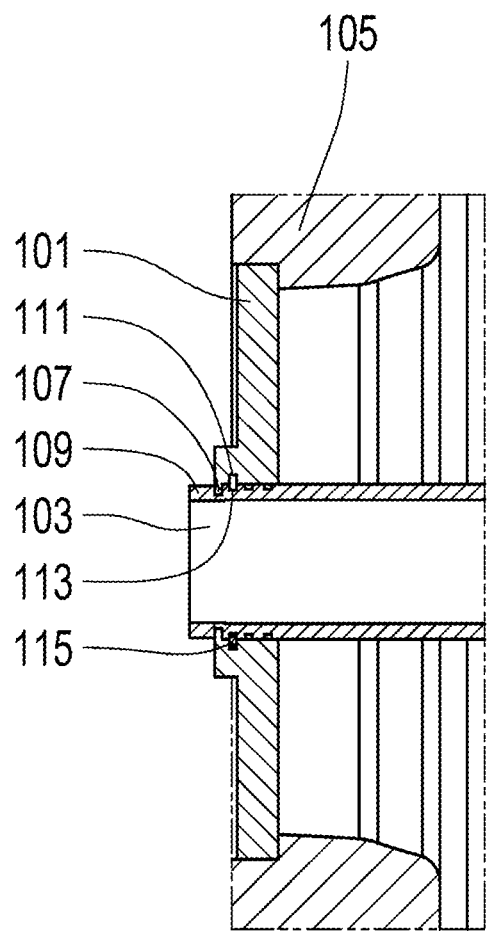
FIG. 1 a fixing means made of polyamide.

Embodiments of the present disclosure provide an improved solution in comparison to the transmissions known from the prior art. In particular, damage that can occur in an integrated drive train due to stray currents are to be avoided.

The transmission can, in some embodiments, be a transmission for a wind turbine. A feedthrough tube, also called pitch tube, is a tube for feeding supply lines, for example electric or hydraulic supply lines, through the transmission. It is characterized in that it passes through the transmission or the housing of the transmission and its mouths are arranged outside the transmission or the housing of the transmission. With respect to the housing of the transmission, the feedthrough tube is preferably sealed off so as to be impermeable to lubricant.

The feedthrough tube is fixed in the transmission, i.e., in at least one component of the transmission, by means of the fixing means. The feedthrough tube may be rotationally symmetrical. Accordingly, the fixing means may be preferably likewise rotationally symmetrical.

The invention is based on the knowledge that the feedthrough tube is a significant transmitter of stray currents due to the fact that it passes completely through the transmission. According to embodiments of the invention, the fixing means therefore comprises an electrical non-conductor, for example made of polyamide. In some embodiments, the fixing means consists of just one or more electrical non-conductors. The fixing means thus electrically insulates the feedthrough tube and the component of the transmission in which the feedthrough tube is fixed by means of the fixing means, from one another. This eliminates a major cause of creepage currents. Embodiments of the present invention effectively prevents creepage currents emanating from a generator from being introduced into the transmission via the feedthrough tube. The insulation according to embodiments the invention is particularly suitable for integrated drive trains since it requires only little installation space.

Preferably, the feedthrough tube is developed so as to be axially immovable in relation to the fixing means, i.e., in the direction of an axis of rotation, for example an axis of rotation of the component in which the feedthrough tube is fixed by means of the fixing means. Accordingly, the fixing means is preferably fixed axially immovably in the transmission or in the component mentioned.

In some embodiments, the component of the transmission in which the feedthrough tube is fixed by means of the fixing means is a shaft, such as a hollow shaft, or a rotatably mounted planetary carrier. In some embodiments, the fixing means electrically insulates the feedthrough tube from the shaft or the planetary carrier.

In some embodiments, the fixing means has a continuous hole. The hole is oriented centrally, i.e., its central axis coincides with a central axis of the feedthrough tube. In some embodiments, the feedthrough tube and the hole can be rotationally symmetrical. In this case, an axis of symmetry of the feedthrough tube and an axis of symmetry of the hole coincide. The feedthrough tube extends through the hole and is joined there to the fixing means.

In some embodiments, the fixing means is joined along its radially outer edge to the component of the transmission in which the feedthrough tube is fixed, or to the shaft or the planetary carrier.

Preferably, the fixing means is developed in such a way that it has the basic shape of a radially oriented disk. The basic shape of a body refers to the shape of an original body from which the first-mentioned body is formed by eliminating individual regions, for example by introducing recesses, or by adding individual regions.

In order to seal the feedthrough tube in a fluid-tight manner with respect to a housing of the transmission, a seal is provided in some embodiments. This seal is axially spaced apart from the fixing means. In some embodiments, the seal and the fixing means can be arranged on opposite walls of the transmission housing. The feedthrough tube is axially displaceable in the seal or in relation to the seal. This ensures that changes in the length of the feedthrough tube due to temperature fluctuations are compensated.

Exemplary embodiments of the invention are shown in the figures. Here, matching reference numbers indicate identical or functionally identical features.

The fixing means 101 shown in FIG. 1 serves to fix a feedthrough tube 103 on the drive side in a planetary carrier 105. The fixing means 101 defines the radial position of the feedthrough tube 103.

The fixing means 101 has lugs 107 which extend radially inward and engage in corresponding recesses 109 of the feedthrough tube 103. This results in a rotationally fixed connection between the fixing means 101 and the feedthrough tube 103. Furthermore, the fixing means has a groove 111 which extends in the circumferential direction around the feedthrough tube 103 and is open inward. The feedthrough tube 103 has a corresponding groove 111. Both grooves 111, 113 are directed toward one another with their openings so that they can jointly accommodate a locking ring 115. The locking ring 115 creates an axial fixing between the fixing means 101 and the feedthrough tube 103.

The fixing means 101 is rigidly fixed in the planetary carrier 105, i.e., a fixing between the fixing means 101 and the planetary carrier 105 does not allow any relative movements between the fixing means 101 and the planetary carrier 105.

The fixing means 101 comprises an electrical insulator. Polyamide is used as an electrical insulator in some embodiments described here.

Figure 2:
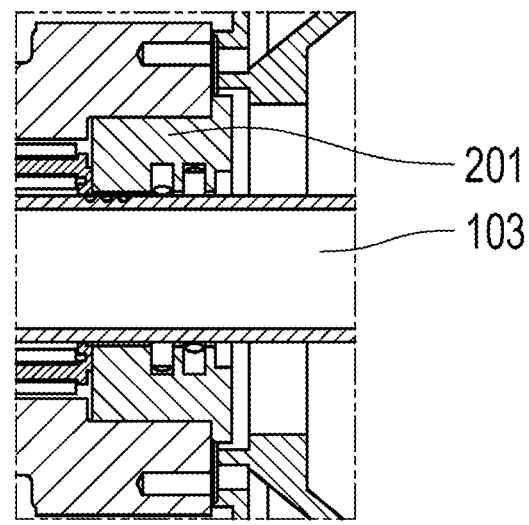
FIG. 2 a seal made of polyamide.

As shown in FIG. 2, a labyrinth seal 201 is provided on the generator side and likewise comprises an insulator, here polyamide. The labyrinth seal 201 on the one hand seals the feedthrough tube 103 with respect to transmission oil leakage and on the other hand ensures electrical insulation.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS

101 Fixing means
103 Feedthrough tube
105 Planetary carrier
107 Lug
109 Recess
111 Groove
113 Groove
115 Locking ring
201 Labyrinth seal

The invention claimed is:

1. An arrangement comprising:
a transmission;
a feedthrough tube; and
a fixing means, wherein:
the feedthrough tube is fixed in the transmission by the fixing means, and
the fixing means is an electrical non-conductor unitary body having a radial thickness and an axial length, the radial thickness being greater than the axial length.

2. The arrangement according to claim 1, wherein the feedthrough tube is fixed axially immovably in the fixing means.

3. The arrangement according to claim 1, wherein the feedthrough tube is fixed by means of the fixing means in a shaft or a rotatably mounted planetary carrier of the transmission.

4. The arrangement according to claim 1, wherein the fixing means has a central, continuous hole and wherein the fixing means is joined to the feedthrough tube in the hole.

5. The arrangement according to claim 3, wherein the fixing means is joined along its radially outer edge to the shaft or the planetary carrier.

6. The arrangement according to claim 1, wherein the fixing means has a basic shape of a radially oriented disk.

7. The arrangement according to claim 1, further comprising a seal axially spaced apart from the fixing means, wherein:
the feedthrough tube is sealed in a fluid-tight manner with respect to a housing of the transmission by means of the seal, and
the feedthrough tube is axially displaceable in relation to the seal.

8. The arrangement according to claim 4, wherein the fixing means is joined along its radially inner edge to the feedthrough tube.

9. The arrangement according to claim 1, wherein the fixing means includes a lug arranged at an axial end and configured to protrude radially into the feedthrough tube.

10. The arrangement according to claim 1, wherein the fixing means includes a first groove and the feedthrough tube includes a corresponding second groove, and wherein a locking ring is arranged within the first groove and the second groove.

* * * * *